United States Patent [19]

Steiner

[11] Patent Number: 5,396,138
[45] Date of Patent: Mar. 7, 1995

[54] ELECTRIC MOTOR

[75] Inventor: Jean P. Steiner, Les Brenets, Canada

[73] Assignee: Johnson Electric S.A., La Chaux du Fonds, Switzerland

[21] Appl. No.: 849,029

[22] PCT Filed: Jul. 16, 1991

[86] PCT No.: PCT/GB91/01173

§ 371 Date: Apr. 22, 1992

§ 102(e) Date: Apr. 22, 1992

[87] PCT Pub. No.: WO92/02068

PCT Pub. Date: Feb. 6, 1992

[30] Foreign Application Priority Data

Jul. 16, 1990 [GB] United Kingdom ............... 9016820

[51] Int. Cl.6 .................................. H02K 1/12
[52] U.S. Cl. ........................................ 310/254
[58] Field of Search ............ 310/45, 40 MM, 49 R, 310/179, 208, 254, 256, 258

[56] References Cited

U.S. PATENT DOCUMENTS

| B 521,044 | 2/1976 | Sims ................... 310/259 |
| 4,392,072 | 7/1983 | Rosenberry ........... 310/216 |
| 4,543,507 | 9/1985 | Heyraud ............... 310/45 |
| 4,612,470 | 9/1986 | Smith, Jr. et al. .... 310/273 |
| 4,837,921 | 6/1989 | Tassinario ............ 29/596 |
| 4,987,331 | 1/1991 | Horng ................. 310/254 |

FOREIGN PATENT DOCUMENTS

| 0017311 | 10/1980 | European Pat. Off. ......... 310/254 |
| 0236690 | 9/1987 | European Pat. Off. ......... 310/254 |
| 0313514 | 4/1989 | European Pat. Off. ......... 29/596 |
| 243512 | 9/1974 | France ........................ 310/254 |
| 2433256 | 8/1979 | France ........................ 310/254 |
| 2805387 | 8/1979 | Germany ...................... 310/254 |
| 61-69343 | 4/1986 | Japan ......................... 310/254 |
| 545730 | 6/1942 | United Kingdom ............. 310/254 |
| 1037902 | 8/1966 | United Kingdom ............. 310/254 |
| 1524638 | 9/1978 | United Kingdom ............. 310/254 |
| 1069067 | 1/1984 | U.S.S.R. ..................... 310/254 |

OTHER PUBLICATIONS

Patent Abstracts of Japan, vol. 14, No. 297 (E-945) (4240) 27 Jun. 1990–Japan 2,095,147 (Hitachi) 5 Apr. 1990.
Patent Abstracts of Japan, vol. 10, No. 133 (E-404) (2190) 17 May 1986–Japan 60 261 334 (Inoue Japax) 24 Dec. 1985.
Patent Abstracts of Japan vol. 12, No. 425 (E-681) (3272) 10 Nov. 1988–Japan 63 161 827 (Matsushita) 5 Jul. 1988.
Patent Abstracts of Japan vol. 8, No. 74 (E-236) (1511) 6 Apr. 1984–58 222 745 (Shibaura) 24 Dec. 1983.
Patent Abstracts of Japan vol. 8, No. 63 (E-233) (1500) 24 Mar. 1984–58 212 360 (Shibaura) 10 Dec. 1983.

Primary Examiner—Steven L. Stephan
Assistant Examiner—Matthew Nguyen
Attorney, Agent, or Firm—Ostrolenk, Faber, Gerb & Soffen

[57] ABSTRACT

A permanent magnet direct current electric motor including a stator core, a stator winding for a stator core, and a magnetic rotor rotatably mounted inside the stator, in which the stator core comprises a closely wound helical coil of ferromagnetic wire, and in which the stator winding is positioned between the stator core and the rotor.

12 Claims, 1 Drawing Sheet

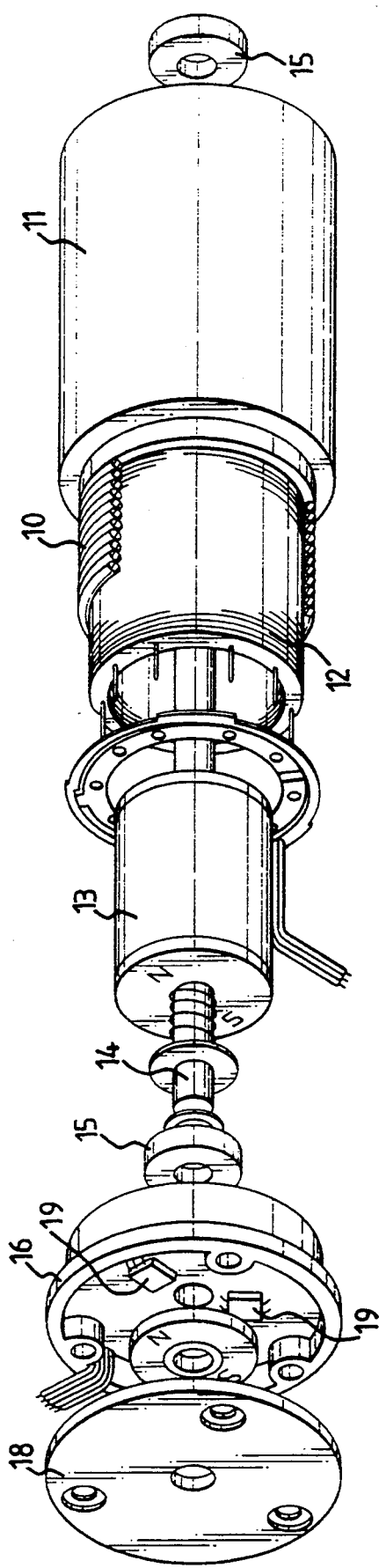
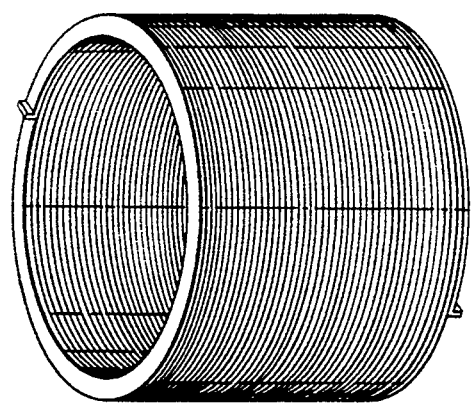
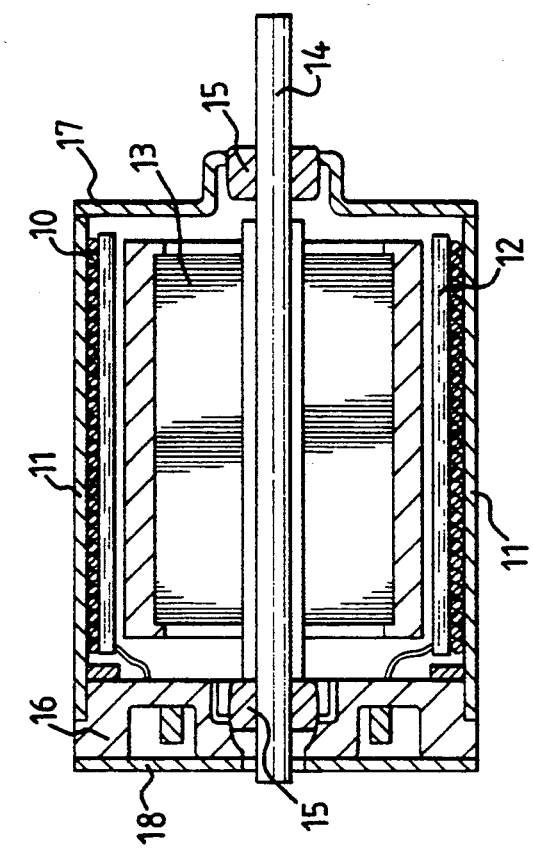
FIG.1
FIG.3
FIG.2

ELECTRIC MOTOR

BACKGROUND OF THE INVENTION

The invention relates to electric motors.

The invention relates more particularly to a brushless direct current electric motor. Such motors comprise a stator core formed of a stack of laminations held in a housing, having a stator winding positioned inside the stack and a magnetic rotor rotatably mounted inside the winding. The manufacture of the laminations and their formation and accurate positioning in the motor configuration which requires accurate stamping to produce the laminations and often post-stamping machining to remove edge burrs, is wasteful of material, and generally leads to relatively slow production methods.

BRIEF DESCRIPTION OF THE INVENTION

According to the one aspect of the invention there is provided a permanent magnet direct current electric motor including a stator core, a stator winding for the stator core, and a magnetic rotor rotatably mounted inside the stator core, in which the stator core comprises a closely wound helical coil of ferromagnetic wire, and in which the stator winding is positioned between the stator core and the rotor.

An embodiment of the invention may comprise a permanent magnet direct current electric motor including a stator core, a preformed cylindrical stator winding for the stator core, and a magnetic rotor rotatably mounted inside the stator winding, in which the stator core comprises a closely-wound helical coil of ferromagnetic wire which fits snugly over the winding having a mean inside diameter substantially equal to the outside diameter of the winding, the coil being arranged to be fitted to the winding by rotating one of its ends relative to the other to increase its inside diameter and sliding the coil over the winding.

The coil of ferromagnetic wire may be formed by at least two separate wires and formed as a multi-start coil.

The ferromagnetic wire may have a rectangular cross-section and for example be square in cross-section.

The ferromagnetic windings of the coil may be held together by one or more joining seams extending axially along the outside of the coil. The seams may be formed by welding.

The electric motor may include a magnetic material housing surrounding and in close proximity to the stator core.

The ferromagnetic wire may be coated with an electrically insulating material. The wire may be aluminium and the coating comprise alumina.

According to another aspect of the invention there is provided a method of assembling a permanent magnet direct current electric motor having a stator core, a preformed stator winding and a magnetic rotor rotatably mounted inside the stator winding, in which the stator core comprises a closely-wound helical coil of resilient ferromagnetic wire, the method comprising gripping the ends of the coil and relatively rotating the ends to increase the mean inside diameter of the coil, sliding the coil relative to the winding to fit the coil to the winding, and releasing the ends of the coil to allow the coil to relax and bear against the winding.

The method may include gripping the ends of the coil and relatively rotating the ends of the coil to decrease the mean diameter of the coil together with the winding inside the coil, sliding the coil and winding inside a casing which fits over the coil, and releasing the ends of the coil to allow the coil to relax and bear against the inside of the casing.

The method may include gripping the ends of the coil and relatively rotating the ends of the coil to decrease the mean diameter of the coil together with the winding inside the coil, and sliding the coil and winding inside a mould.

BRIEF DESCRIPTION OF THE DRAWINGS

A brushless fractional horsepower direct current motor according to the invention will now be described by way of example with reference to the accompanying diagramatic drawings in which:

FIG. 1 is an exploded view of the motor;

FIG. 2 is a cross-sectional view of motor; and

FIG. 3 is an isometric view of another stator core for the motor.

DETAILED DESCRIPTION OF THE PREFERRED EMBODIMENT

Referring to the drawings, in FIGS. 1 and 2 the motor includes a coiled stator core 10 formed of a tightly wound helical coil of ferromagnetic wire which fits inside a deep drawn ferromagnetic steel can 11. A preformed basket stator winding 12 is positioned inside and against the coil 10 which in use is energized to produce a magnetic flux inside the motor. A permanent magnet rotor 13 which is polarized as indicated is mounted on a shaft 14 supported in bearings 15 by respective end plates 16 and 17. A cover plate 18 fits over the end plate 16.

The winding 12 is connected to an external supply and supplied through Hall effect integrated circuits 19 supported by the end plate 16. The circuits respond to changes in magnet field as the rotor 13 rotates to switch and control the direction of current in the winding 12 so that the rotor 13 is driven in one rotational direction as it rotates. Such driving and current direction control arrangements are well-known in brushless motors.

The stator core 10 formed by the coil is in contrast unique and is provided to replace laminations formerly used to form a stator core. Laminations are normally stamped out from solid plates of magnetic material which requires accurate stamping and/or post-stamping machining especially to remove burrs. The laminations must be accurately stacked and held together and fitted inside a casing. The basket winding must then be fitted closely inside the laminations and may and can often be damaged during insertion.

In the described arrangement the coiled stator core 10 is formed by closely coiling a continuous wire of ferromagnetic wire into a cylindrical form. The coil is inherently flexible to some extent and is preferably formed with an inner diameter slightly less than the outer diameter of the basket winding 12. The diameter of the coiled stator core 10 can be decreased or increased by relatively rotating its opposite ends appropriately. Thus, to fit the coiled stator core 10 onto the basket winding 12, the diameter of the coiled stator core 10 is increased and once the basket is positioned within the coiled stator core 10, the diameter of the coiled stator core 10 is decreased so that the coiled stator core 10 fits snugly against the outside surface of the winding 12. This means that any air gaps between the coiled stator core 10 and outside of the winding 12 are reduced to a minimum. This is especially the case as the springyness or flexibility of the coiled stator core 10 allows it to fit snugly along the whole length of the winding 12 even though the outside diameter of the winding 12 may vary somewhat along its length.

Normally in the describe arrangement and preferably, the coiled stator core 10 is formed initially with an internal diameter which is an interference fit on the outside surface of the winding 12. The diameter of the coiled stator core 10 is increased as mentioned, by relatively rotating its ends, and the winding 12 is then slid inside the coiled stator core. The ends of the coil 10 are then released so that the coiled stator core 10 "relaxes" and snugly surrounds and embraces the winding 12.

The coiled stator core 10 can be fixed into a secure configuration by forming an axial seam to join adjacent strands of the coil. For example, a laser welding machine can be tranversed along the length of the coiled stator core 10 to form a seam of tack welds to hold the strands of the coil together. Two or more seams can be formed in this way spaced from one another around the periphery of the coil as desired.

Once the coiled stator core 10 has been fixed in this way, the assembly (of the stator core 10 and winding 12) is rigid and if desired end caps can be fitted directly to the ends of the coiled stator core 10 to provide support for the end bearings. In other words, the motor may be made without the casing 11 shown in the drawings.

This assembly may also be first placed in an injection molding tool in which the coil has not been fixed (e.g. welded). The coiled stator core 10 even with the winding 12 already fitted, can be reduced in overall diameter at least to some extent, as explained above. Thus, the coil 10 may be reduced in outside diameter advantageously while being fitted into the mold tool. This facilitates the fitting of the assembly into he mold tool and reduces the possibility of the tool being damaged during fitting of the assembly.

In the described arrangement, the assembly, that is the coiled stator core 10 and winding 12, must be fitted into the case 11. The case is made of steel and so additionally increases the flux return path of the motor. As the assembly is somewhat flexible as described, the fitting is preferably carried out by temporarily and slightly reducing the outside diameter of the coiled stator core 10, as described. Once the coil has been slid inside the case 11 the ends of the coiled stator core 10 are released to allow the coil to expand and fit snugly against the inside of the case 11 as desired. As such in the final assembly, the three components (the case 11, the coiled stator core 10 and the winding 12) become a tight snug fit with one another. The end caps and the rotor are then fitted to this final assembly to form the complete motor.

The wire used to form the stator core 10 in FIG. 1 is round wire and formed by a single start winding. If desired the coiled stator core 10 may be formed with a multistart winding for example using two or three strands of wire wound together side by side along the length of the finished coil. Also, the wire may be rectangular in cross-section, as shown in FIG. 3.

The wire of the coiled stator core 10 may be pre-coated with electrical insulating material before being wound into its cylindrical form. The coiled stator core 10 may be fed of aluminium or an aluminium coating may be applied to the outer surface of wire of other materials. In such a case the outside of the wire can be oxidized in a continuous process to form alumina which provides an outer insulating coating, and then the wire is wound into a coiled stator core. Such a coiled stator core is also generally chemically inert and therefore suitable for use in motors used as fuel pumps or in chemical process plants where the motor may be submerged.

I claim:

1. A permanent magnet direct current electric motor, including a stator core, a preformed cylindrical stator winding for the stator core and a magnetic rotor rotatably mounted inside the stator winding, in which the stator core comprises a preformed, flexible closely-wound helical coil of resilient ferromagnetic wire which fits snugly over the winding and having a mean inside diameter substantially equal to an outside diameter of the winding, the coil being arranged to be fitted to the winding by rotating one of its ends relative to the other to increase its inside diameter and sliding the coil over the winding.

2. A permanent magnet direct current electric motor, comprising:
    (a) a generally cylindrical stator winding;
    (b) a magnetic rotor mounted for rotation inside the stator winding; and
    (c) a preformed, flexible, cylindrical stator core disposed on a radially outward surface of the stator winding, the stator core comprising a single layer coil formed of at least one resilient ferromagnetic wire extending helically over the axial length of the coil in radial engagement with the stator winding.

3. An electric motor according to claim 2, in which the stator winding is a basket winding.

4. An electric motor according to claim 2, in which the single layer coil comprises at least two separate wires and is formed as a multi-start coil.

5. An electric motor according to claim 2, in which the ferromagnetic wire has a rectangular cross-section.

6. An electric motor cording to claim 2, in which the ferromagnetic windings of the coil are held together by one or more joining seams extending axially along outside of the coil.

7. An electric motor according to claim 6, in which the seams are formed by welding.

8. An electric motor according to claim 2, in which the coil and winding are surrounded by a rigid protective coating formed in a mold.

9. An electric motor according to claim 6, in which end plates are coupled to the coil and arranged to rotatably support the magnetic rotor.

10. An electric motor according to claim 2, including a magnetic material housing surrounding and in close proximity to the stator core.

11. An electric motor ac cording to claim 2, in which the ferromagnetic wire is coated with an electrically insulating material.

12. An electric motor according to claim 11, in which the electrically insulating material is aluminium having an outer surface of alumina.

* * * * *